United States Patent Office 3,209,588
Patented Oct. 5, 1965

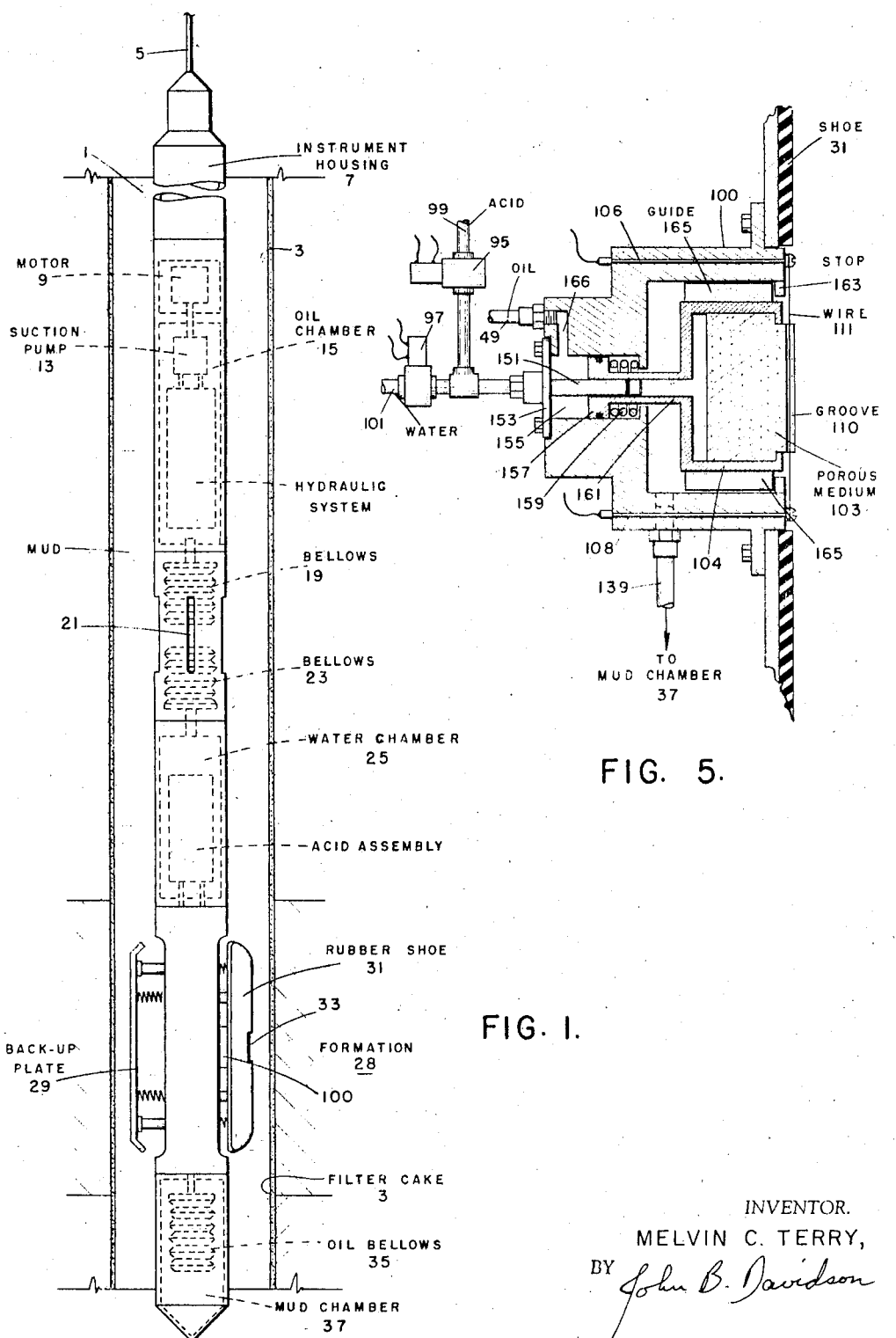

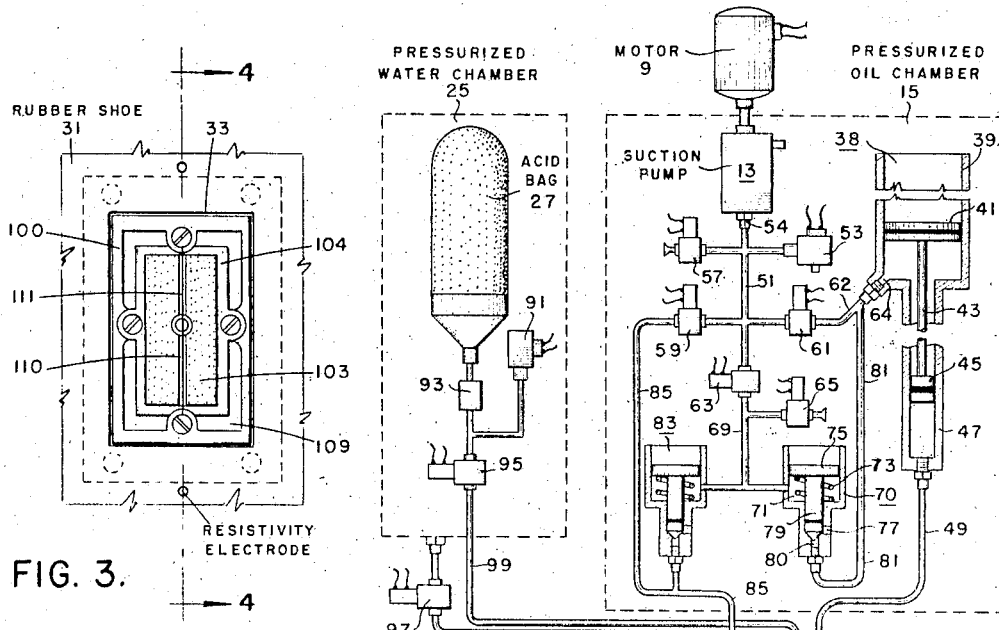
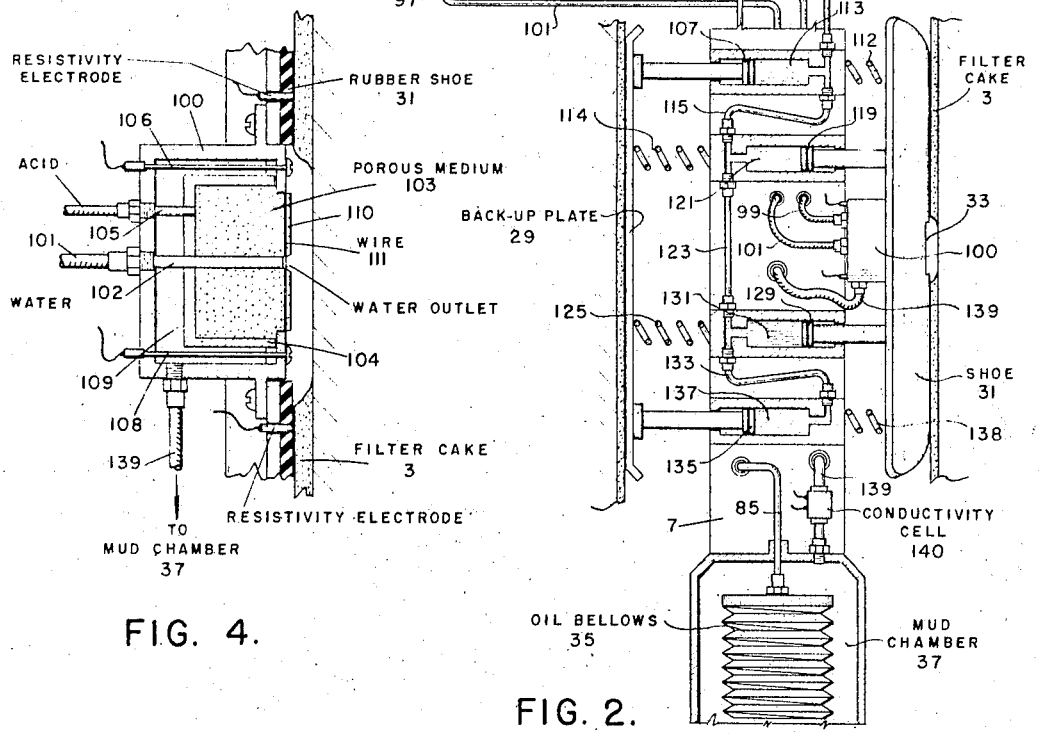
FIG. 3.
FIG. 4.
FIG. 2.
INVENTOR.
MELVIN C. TERRY,
BY
ATTORNEY.

3,209,588
APPARATUS AND METHOD FOR LOGGING BOREHOLES WITH FORMATION TESTING FLUIDS
Melvin C. Terry, Houston, Tex., assignor, by mesne assignments, to Esso Production Research Company, Houston, Tex., a corporation of Delaware
Continuation of application Ser. No. 730,638, Apr. 24, 1958. This application Mar. 3, 1961, Ser. No. 94,115
13 Claims. (Cl. 73—152)

This is a continuation of application Serial No. 730,638 of Melvin C. Terry for "Well Logging Method and Apparatus" filed April 24, 1958.

This invention relates to the determination of characteristics of earth formations, and more particularly to techniques for determining characteristics of earth formations that involve the injection of diagnostic fluids behind a filter cake lining the wall of a borehole in the earth.

To determine the characteristics of earth formations around a borehole, it is often desirable to inject a diagnostic fluid through the filter cake that lines the wall of the borehole. For example, in connection with well logging operations it may be desirable to inject an oxidizing agent such as perchloric acid behind the filter cake. Changes in temperature in the earth formations contacted by the acid may be indicative of the presence of hydrocarbons in the formations. As another example, surface-active reverse wetting agents consisting of a cationic salt may be injected behind a filter cake in connection with resistivity logging of boreholes in the manner described in U.S. Patent No. 2,873,423—J. W. Graham et al.

In order to inject testing fluids into earth formations, it may be necessary or desirable to remove the filter cake lining the borehole. However, when the borehole mud pressure is higher than the pressure of connate fluids in the formation, it has been found extremely difficult, if not impossible, to scrape away the filter cake and to inject fluid into the exposed earth formation. The reason for this difficulty appears to be that the filter cake is re-formed as soon as it is scraped away if the borehole mud pressure is greater than earth formation fluid pressure.

In accordance with the teachings of this invention, a portion of a filter cake surface is isolated from borehole pressure, for example, by means of a suitable caisson or other rigid-walled isolating means. The pressure on the portion of the filter cake surface thus isolated is reduced below the pressure exerted on the filter cake by connate earth formation fluids. Formation fluids will tend to flow out of the formation; and if the pressure is sufficiently reduced, the filter cake may rupture and wash away. Testing fluids may then be injected into the earth formation through the perforation in the filter cake resulting from the washing away of the ruptured cake.

According to a more specific aspect of the invention, to aid formation fluids in washing away the filter cake, the selected portion of the surface of the filter cake may be subjected to fluid flow from a flexible reservoir subject to borehole pressure. The washing fluid within the fluid reservoir may include testing chemicals such as reverse wetting surfactants consisting of a cationic salt. Such reverse wetting agents alter the capillary action of earth formations to cause them to become preferentially oil wet. The significance of resistivity tests on the earth formation is substantially enhanced by treatment with such surface-active reverse wetting agents.

Various objects and features of the invention, including those which may be gathered from the above discussion, will become apparent from the following description considered in connection with the accompanying drawings, wherein:

FIG. 1 is a simplified schematic presentation of an embodiment of the apparatus of the invention;

FIG. 2 is a more detailed presentation, partially in cross section, of the apparatus shown in FIG. 1;

FIG. 3 is a front view of a portion of the apparatus of FIG. 2;

FIG. 4 is a sectional side view of the apparatus of FIG. 3; and

FIG. 5 is a view similar to FIG. 4 illustrating a modification of the invention.

The invention will first be described with reference to the embodiment illustrated in FIGS. 1, 2, 3, and 4. In FIG. 1 an instrument housing 7 is shown suspended from logging cable 5 within borehole 1. The borehole is lined with a filter cake 3 deposited on the walls of the borehole during drilling operations. The interior of instrument housing 7 is open to borehole pressure (i.e., the pressure exerted by the drilling fluid in the vicinity of the housing) through openings 21. The instrument housing may be an elongated cylinder constructed according to known techniques for logging sondes.

The instrument housing carries a deformable pad or shoe 31 of rubber or rubber-like material having a central opening 33. The pad surrounds the open end of a caisson or rigid-walled container 100. When the pad is rammed against the surface of filter cake 3, it is adapted to isolate a section defined by the opening 33. The function of pad 31 is to provide a fluid seal between the edge of the opening 33 and filter cake 3 so as to prevent entry of borehole fluids into the caisson. The rubber shoe is hydraulically rammed against the filter cake by apparatus including back-up plate 29; this ramming apparatus will be described in more detail below. The rubber pad 31, back-up plate 29, and certain of the associated apparatus may be substantially the same as the apparatus described by M. Lebourg et al. in Paper No. 701-G presented at the fall 1956 meeting of the American Institute of Mining and Metallurgical Engineers in Los Angeles, California.

Caisson 100 encloses a container 104 which is affixed to and suitably spaced from caisson 100 so as to leave a space or passageway 109 between the caisson 100 and container 104. Container 104 houses a porous medium 103 which may substantially fill the interior of the container. Container 104 is open-ended, and porous medium 103 protrudes through the passageway. The porous medium may consist of a block of carborundum, sandstone, sintered glass, silica, or a permeable, porous ceramic. The function of porous medium 103 is to disperse liquids injected into the system so that the liquids will contact as large an area as possible of the filter cake or earth formation against which the porous medium is pressed.

As shown most perspicuously in FIGS. 1 and 2, a pair of flexible fluid reservoirs 25 and 27 are provided within which are stored water (in reservoir 25) and acid (in reservoir 27). Reservoir 27 is housed within reservoir 25, and reservoir 25 is exposed to borehole pressure by way of bellows 23. Acid reservoir 27 is hydraulically coupled to the interior of container 104 through a constriction 93, a normally closed, electrically actuated valve 95, suitable intermediate fluid conduits, and a fluid conduit 99 between valve 95 and container 104. Fluid from tube 105 must pass through the porous medium 103 in order to reach the exposed face of the porous medium.

Similarly, water chamber 25 is hydraulically coupled to the interior of container 104 through normally closed, electrically actuated valve 97, conduit 101, and tube 102. While tube 102 may terminate at the rear of porous medium 103, in FIG. 4 it is shown as extending through the porous medium 103 so that fluids from tube 102 will be sprayed directly against the filter cake or earth formation.

The acid to be stored in acid bag 27 may be perchloric acid or one of the other suitable oxidizing agents described in U.S. Patent No. 2,708,155—S. E. Buckley et al. The bag or reservoir within which the acid is stored should be resistant to the particular acid used. When perchloric acid is used, it has been found that Kel-F rubber is a suitable material for the acid bag.

The water in reservoir 25 may include a suitable reverse wetting surfactant such as described in the aforecited U.S. Patent No. 2,873,423.

A vertical groove 110 may be cut in the face of porous medium 103 for the purpose of protecting a platinum wire 111 or other suitable device for measuring temperature changes. Platinum wire is a preferred temperature measuring device as its resistivity changes significantly with changes in temperature. The platinum wire is connected between electrical connectors 106 and 108 which extend from front to rear of caisson 100. In this connection, it should be noted that unless the connectors are suitably insulated from the caisson, the caisson should be made of an electrically insulative material. The connectors 106 and 108 may be connected to a suitable telemetering arrangement for transmitting the changes in resistivity of wire 111 up the borehole on cable 5 to the earth's surface.

It should be noted that the acid bag 27 and water reservoir 25 should be positioned above caisson 100 so that fluid will readily flow therefrom.

Deformable shoe or pad 31 is rammed against the filter cake by apparatus including back-up plate 29, pistons 107, 119, 129, and 135 within chambers 113, 121, 131, and 137, respectively, and tension springs 112, 114, 125, and 138. The tension springs normally pull back-up plate 29 and deformable pad 31 away from the wall of the borehole. When pressurized fluid is injected into chambers 113, 121, 131, and 137, the forces on the pistons will force back-up plate 29 and pad 31 into firm engagement with the filter cake lining the borehole. A suitable hydraulic pressure for this purpose is about 4500 pounds per square inch.

The pressure for actuating the pistons 107, 119, 129, and 135 is derived from an electric motor-driven suction pump 13 and a pressure amplifying and reversing apparatus 38. Pressure gauge 53 measures the pressure across pump 13. The inlet of suction pump 13 is connected to several oil filled hydraulic circuits, and the outlet of the pump discharges into a chamber 15. Chamber 15 is hydraulically coupled to a bellows 19 exposed to borehole pressure. Thus, suction pump 13 discharges into a fluid medium exposed to borehole pressure.

Pressure amplifying and reversing means 38 includes a piston cylinder 39, the open end of which works against the oil in chamber 15 (and thus against borehole pressure), a smaller piston cylinder 47, and a pair of pistons 41 and 45 coupled together by connecting rod 43.

The inlet 54 of suction pump 13 is coupled to the space between pistons 41 and 45 through conduit system 51, electrically actuated valve 61, conduit 62, and port 64. The differential pressure produced by suction pump 13 will be transmitted to the space between the pistons 41 and 45 and will appear as a differential pressure across piston 41. Piston 45 works against oil that fills the lower end of cylinder 47, conduits 49, 115, 123, and 133, and piston cylinders 113, 121, 131, and 137. The differential pressure across piston 41 will tend to move pistons 41 and 45 downwardly. The differential pressure will be amplified because of the difference in the areas of the faces of pistons 41 and 45. Inasmuch as piston 45 works against a virtually incompressible liquid, the liquid will exert pressure on pistons 107, 119, 129, and 135 to force the pistons outwardly from housing 7. Thus, with valve 61 open, the ultimate effect of suction pump 13 will be to force pistons 107 and 135 to move to the left as shown, and to force pistons 119 and 129 to move to the right as shown.

Manifestly, should the electrical connection to valve 61 be broken (thereby closing valve 61) while the pad 31 and back-up plate 29 are rammed against the filter cake 3, it will be virtually impossible to dislodge instrument housing 7. Therefore, there is provided a failsafe system including valve 63 (which couples conduit system 51 to conduit system 69 when electromagnetically actuated valve 63 is opened) and electromagnetically actuated valve 65, which when unactuated couples conduit system 69 to the interior of chamber 15. Upon actuation of valve 65, fluid communication between conduit system 69 and the interior of chamber 15 is cut off. Conduit system 69 also opens into a chamber 71 within valve 70. Valve stem 79 is moved downwardly against the pressure of coil spring 73 by differential pressure across piston 75. When valve stem 79 is in its lowermost position as shown, the lower end of the stem cuts off fluid communication between ports 80 and 77. Port 80 is coupled to port 64 of pressure reversing and amplifying means 38 by conduit 81. Thus, should there be a break in the electrical connection from the surface, valve 65 will open to relieve the differential pressure across piston 75. Valve stem 79 will move upwardly, relieving the differential pressure across piston 41 and removing the pressure on pistons 107, 119, 129, and 135 so that tension springs 112, 114, 125, and 138 can retract back-up plate 29 and pad 31.

For the purpose of lowering the pressure in opening or space 109, there is provided a rigid-walled mud chamber 37 hydraulically coupled to the space 109 by conduit 139, and an oil filled bellows 35 within chamber 37, coupled to the inlet 54 of suction pump 13 by fluid conduit 85, normally closed electromagnetically actuated valve 59, and conduit system 51. Bellows 35 and conduit 85 are at all times filled with oil. When valve 59 is open, suction pump 13 will draw oil out of bellows 35 to reduce the pressure within chamber 37. Thus, the pressure in space 109 and on the surface of the portion of the filter cake defined by caisson 100 and deformable pad 31 will be substantially lowered. A valve arrangement 83 similar to valve 70 is provided for the purpose of relieving the differential pressure on caisson 100, which may be sufficient to hold pad 31 against the filter cake 3.

A pressure gauge 91 is coupled to the conduit between constriction 93 and valve 95. The purpose of gauge 91 is to measure the volume of the fluid flowing from constriction 93. Since the acid within acid reservoir 27 is at substantially the same pressure as the water within chamber 25, pressure gauge 91 measures the pressure across constriction 93. The cross-sectional area of constriction 93 is readily determinable, so the volume of fluid passing through constriction 93 to porous medium 103 can be easily calculated.

The function of pressure gauge 91 is to produce an output signal indicative of the pressure being measured by the gauge. The electrical signals may be transmitted to the earth's surface by a suitable transmission system.

Separate electrical leads from the earth's surface may control each of the electromagnetically actuated valves described above, or a suitable remote control system may be utilized for controlling the actuation of the valves with a minimum number of wires in the cable from which the instrument housing is suspended.

The operation of the apparatus described above is as follows. Let it be assumed that instrument housing 7 has been lowered into a borehole until rubber pad 31 is adjacent an earth formation on which it is desired to run a test. Electric motor 9 is energized to drive suction pump 13, and valves 63 and 65 are actuated to close valve 65 and open valve 63. The differential pressure applied across piston 75 will close port 80. Valve 63 now may be closed. Valve 61 now may be opened; since port 80 is no longer open to fluid communication with port 77, the differential pressure created by suction pump 13 will be applied across piston 41, and a resulting pressure produced by the attempted downward movement of piston 45 will force back-up plate 29 and pad 31 outwardly against the filter cake lining the wall of the borehole. The interior of caisson 100 now will be isolated from borehole fluids.

At the same time that valve 70 is actuated by opening valve 63 and closing valve 65, the piston and stem of valve 83 are moved downwardly so that conduit 85 is no longer open to the pressure within chamber 15 through the ports of valve 83. When valve 59 is opened, bellows 35 will contract to decrease the pressure within space 109 so that earth fluids will flow against the filter cake 3. When valve 97 is opened, water will be directed against filter cake 3 to aid the fluids from earth formation 28 to wash away the filter cake. Particles of the filter cake, the wash water from reservoir 25, and earth formation fluids will flow through space 109, conduit 139, and will be stored in mud chamber 37. Conductivity measuring cell 140 in conduit 139 is inserted to measure the conductivity of fluids flowing through conduit 139. Cell 140 may consist of a pair of insulated electrodes coupled to a potential source through suitable current measuring apparatus. The electrical signals produced by conductivity cell 140 are transmitted to the earth's surface to provide the operators with an indication of the nature of the fluids passing through conduit 139.

As soon as the output signals from conductivity cell 140 indicate that formation fluids are flowing freely into mud chamber 39, the suction pump 13 may be stopped. If the water in reservoir 25 contains a reverse wetting agent, readings may be made of the resistivity of formation 28 by means of suitable resistivity measuring electrodes which may be affixed to pad 31, preferably as close to caisson 100 as possible. (When resistivity readings are to be made, caisson 100 and container 104 should either be made of electrically nonconductive material, or suitably insulated from the earth formation to prevent current from flowing therethrough during a resistivity measurement.) When the resistivity reading is completed, valve 95 may be opened, a predetermined amount of perchloric acid may be allowed to flow through conduit 99 and porous medium 103 to contact earth formation 28, and the change in temperature indicated by the change in resistivity of platinum wire 111 may be noted. Pad 31 and back-up plate 29 may now be retracted either by de-energizing the actuating coil of valve 65 or by energizing the actuating coils of valves 61 and 57. This will remove the pressure on pistons 107, 119, 129, and 135 to retract the pad and back-up plate. The instrument housing now either may be brought to the earth's surface or may be repositioned in the borehole for another measurement.

It is possible to estimate certain of the properties of the earth formations from pressure gauge readings of the pressure in caisson 100. For example, the pressure maintained during the pumping operation after the filter cake is broken will depend on the pumping rate (which will be more or less constant) and formation permeability. When the pump is stopped, the pressure will come to that of the formation. Formation permeability will be indicated by the equilibrium pressure attained, the rate at which the pressure in the caisson rises to formation pressure, and the rate at which the various fluids may be injected.

FIG. 5 illustrates another embodiment of the invention which is adapted for use when the filter cake is unusually thick. When the filter cake is unusually thick, it may be difficult for porous medium 103 to contact earth formations after a portion of the filter cake adjacent the medium has been removed. Inner container 104 for porous medium 103 is supported by guides 165 and is adapted to move to the right and left as viewed in FIG. 5. The container is normally biased to the left by coil springs 159 which bear against piston 157. Fluid pressure from conduit 49 is applied to the space between end plate 153 and piston 157 through port 166. Water line 101 and acid line 99 are connected together near end plate 153 and are injected into container 104 through nipple 151 and the interior of container neck 161. Acid valve 95 and water valve 97 should be as close as possible to the juncture of lines 99 and 101 and to end plate 153.

The operation of the apparatus of FIG. 5 differs from that of the embodiment of FIGS. 1 through 4 in that fluid pressure applied to chamber 155 will force container 104 and medium 103 to the right as the filter cake disintegrates. In due course, guides 165 will strike stop members 163, and springs 159 will be completely compressed. Note also that wash water will filter through the porous medium 103 to aid formation fluids in washing away the filter cake.

Various changes may be made in the above-described invention, and different embodiments of the invention may be made without departing from the spirit and scope thereof. Therefore, it is intended that all of the matter contained in the above description and shown in the accompanying drawings shall be construed as illustrative and not in a limiting sense.

What is claimed is:

1. Apparatus for removing a portion of a filter cake lining the wall of a borehole and injecting formation testing fluids into earth formations behind said filter cake, comprising: a fluid permeable block; an open-ended container for said block including a fluid impermeable lining for said block isolating said block from the interior of said container, said block having an exposed portion at said open end; deformable sealing means around said open end of said container adapted to provide a fluid-tight seal between the interior of said container and the interior of said borehole when said open end abuts said filter cake; means for abutting said open end against a portion of said filter cake; means hydraulically coupled to the interior of said container for reducing the pressure within said container to a pressure less than the pressure exerted by earth formation fluid on said portion of said filter cake to perforate said portion of said filter cake; and means for injecting said testing fluids through said lining for said block so that said testing fluids can filter through said block and through the perforation produced by perforating the filter cake into the earth formations.

2. Apparatus for removing a portion of a filter cake lining the wall of a borehole and injecting formation testing fluids into earth formations behind said filter cake, comprising: a fluid permeable block; a first fluid impermeable container for said block; a second fluid impermeable container for said first container, spaced from said first container; said first and second containers each having an open side to permit said block to contact said filter cake; means for effecting a fluid-tight seal between said filter cake and said second container around said open side of said second container; means for lowering the pressure in the space between said first and second containers to draw earth formation fluids through said filter cake in sufficient volume to wash away at least a portion of the filter cake through which said formation fluids pass; and means connected to said first container for controllably injecting said formation testing fluids through said fluid permeable block.

3. Apparatus for injecting formation testing fluids into earth formations behind a filter cake lining the wall of a borehole, comprising: a rigid-walled caisson, said caisson having an open end adapted to be positioned against said filter cake; means connected to said caisson for effecting a fluid-tight seal between said caisson and said filter cake to prevent entry into said caisson of fluids within said borehole; means connected to said caisson for lowering the pressure within said caisson relative to borehole pressure to produce a differential pressure across said filter cake to effect a flow of formation fluids into said caisson of sufficient magnitude to wash away at least a portion of the filter cake through which said earth formation fluids flow; and means connected to said caisson for controllably injecting said testing fluids through said caisson into said earth formations.

4. Apparatus for testing earth formations traversed by a borehole, comprising: a first container having an open end; a porous block; a second open-ended container within said first container, said second container being adapted to partially enclose said porous block so that an exposed face of said porous block protrudes through said open end of said first container; first and second flexible fluid reservoirs exposed to borehole pressure; a suction pump having an inlet and an outlet, and adapted to work against borehole pressure at its outlet; a rigid-walled chamber; fluid conduit means hydraulically coupling said rigid-walled chamber with the interior of said first container; first electrically actuated valve means; a bellows within said chamber, and fluid conduit means coupling the interior of said bellows to said pump inlet through said first electrically actuated valve means upon actuation of said valve means; coupling means including second electrically actuated valve means hydraulically coupling the interior of said first fluid reservoir to the interior of said second container; coupling means including third electrically actuated valve means hydraulically coupling the interior of said second fluid reservoir to said second container; a deformable pad affixed to said first container around said open end thereof adapted to provide a fluid-tight seal against entry of fluids from said borehole into said first and second containers; a hydraulically actuable ram for forcing said pad, said first container, and said porous block against said filter cake; and pressure reversing means and fourth electrically actuable valve means coupling said pump inlet to said ram for application of a positive pressure to said ram relative to borehole pressure to actuate said ram when said fourth valve means is actuated; said first, second, third, and fourth valve means being individually actuable by electrical connections to the earth's surface; and means for automatically bypassing said fourth valve means and said suction pump means upon de-energization of electrical connections to said fourth valve means.

5. Apparatus for testing earth formations traversed by a borehole, comprising: a first container having an open end; a porous block; a second open-ended container within said first container, said second container being adapted to at least partially enclose said porous block so that an exposed face of said porous block protrudes through said open end of said first container; first and second flexible fluid reservoirs exposed to borehole pressure; a suction pump having an inlet and outlet, adapted to work against borehole pressure at its outlet; a rigid-walled chamber; fluid conduit means hydraulically coupling said rigid-walled chamber with the interior of said first container; first electrically actuated valve means; a bellows within said chamber, and fluid conduit means coupling the interior of said bellows to said pump inlet through said first electrically actuated valve means upon actuation of said valve means; coupling means including second electrically actuated valve means hydraulically coupling the interior of said first fluid reservoir to the interior of said second container; coupling means including third electrically actuated valve means hydraulically coupling the interior of said second fluid reservoir to said second container; a deformable pad affixed to said first container around said open end thereof adapted to provide a fluid-tight seal against entry of fluids within said borehole into said first and second containers; a hydraulically actuable ram for forcing said pad, said first container, and said porous block against said filter cake; and pressure reversing means and fourth valve electrically actuable means coupling said pump inlet to said ram for application of a positive pressure to said ram relative to borehole pressure to actuate said ram when said fourth valve means is actuated; said first, second, third, and fourth valve means being individually actuable by electrical connections to the earth's surface.

6. Apparatus for testing earth formations traversed by a borehole, comprising: a first container having an open end; a porous block; a second open-ended container within said first container, said second container being adapted to at least partially enclose said porous block so that an exposed face of said porous block protrudes through said open end of said first container; said second container being further adapted to reciprocably move within said first container at least a limited distance through the open end of said first container; first and second flexible fluid reservoirs exposed to borehole pressure; a suction pump having an inlet and outlet, adapted to work against borehole pressure at its outlet; a rigid-walled chamber; fluid conduit means hydraulically coupling said rigid-walled chamber with the interior of said first container; first electrically actuated valve means; a bellows within said chamber, and fluid conduit means coupling the interior of said bellows to said pump inlet through first electrically actuated valve means upon actuation of said valve means; coupling means including second electrically actuated valve means hydraulically coupling the interior of said first fluid reservoir to the interior of said second container; coupling means including third electrically actuated valve means hydraulically coupling the interior of said second fluid reservoir to said second container; a deformable pad affixed to said first container around said open end thereof adapted to provide a fluid-tight seal against entry of fluids within said borehole into said first and second containers; a hydraulically actuable ram for forcing said pad, said first container and said porous block against said filter cake; hydraulic means for forcing said second container through said open end of said first container so that said porous block is at all times in contact with said filter cake; and pressure reversing means and fourth electrically actuable valve means coupling said pump inlet to said ram for application of a positive pressure to said ram relative to borehole pressure to actuate said ram when said fourth valve means is actuated; said first, second, third, and fourth valve means being individually actuable by electrical connections to the earth's surface.

7. Apparatus for perforating the filter cake lining the wall of a borehole, comprising: a rigid-walled caisson adapted to isolate a portion of the surface of said filter cake; deformable sealing means affixed to said caisson for providing a fluid-tight seal between the edge of said caisson and the filter cake against which said edge abuts; means hydraulically connected to the interior of said caisson for reducing the pressure within said caisson below the pressure of the formation fluid in the earth formation adjacent said portion of said filter cake surface to produce flow of formation fluids through said filter cake into said caisson sufficient to wash away a section of said filter cake; and means for simultaneously injecting washing fluid through said caisson against said portion of said filter cake surface.

8. Apparatus for injecting fluids into earth formations through a borehole filter cake while said borehole is subject to a pressure of predeterminable magnitude, comprising: an elongated housing member housing a first flexible reservoir for said fluids, a second reservoir for receiving earth formation fluid, a third flexible reservoir enclosing said first flexible reservoir and a predetermined quantity of water, a deformable pad surrounding a metallic caisson means adapted to abut against a portion of the surface of said filter cake to isolate said portion and the space enclosed by said caisson means from said borehole, and hydraulically actuated means for ramming said pad against the wall of said borehole to provide a fluid-tight seal for said portion of said filter cake surface; suction pump means adapted to produce a pressure less than borehole pressure in the vicinity of said housing member; means, including first normally closed electrically actuable valve means and said second reservoir, coupled to said pump means and to the interior of said caisson, adapted upon actuation of said valve means to lower the pressure within said caisson relative to said borehole pressure for the purpose of drawing earth formation fluid through said filter cake; means including second normally closed electrically actuable valve means, hydraulically coupling said first reservoir to the interior of said caisson adapted to inject fluid within said first reservoir into said caisson means; means including third electrically actuable, normally closed valve means, hydraulically coupling said third reservoir to the interior of said caisson adapted to inject fluid within said third reservoir into said caisson; and means including fourth normally closed electrically actuable valve means and pressure reversing and amplifying means coupling said pump to said hydraulically actuable means adapted, upon actuation of said valve means, to apply a pressure to said hydraulically actuable means that is greater than borehole pressure to actuate said hydraulically actuable means; all of said valve means being selectively actuable from a remote location.

9. Apparatus for determining the nature of fluids in earth formations surrounding a borehole having a filter cake on the wall thereof, comprising: a first housing means adapted to be lowered into said borehole; an annular, deformable pad having a central opening affixed to said first housing means; hydraulically actuated jacking means carried by said first housing means, adapted when actuated to ram said pad against said filter cake to form a fluid-tight seal between said pad and said filter cake; caisson means affixed to said pad adapted to isolate the portion of said filter cake defined by said pad from said borehole; tension spring means affixed to said housing and to said pad and said jacking means adapted to normally constrain said jacking means and said pad away from the sides of said borehole; a porous solid within said second housing means positioned to abut against said portion of said filter cake and supported by a fluid-tight container affixed to said caisson; said caisson means and said container defining a generally annular space opening against said portion of said filter cake, through which fluids from said porous solid and formation fluids may flow; a first fluid reservoir carried by said first housing and subject to borehole pressure; a second fluid reservoir within said first fluid reservoir; means including electrically actuated valve means coupling said second fluid reservoir to said container to permit the flow of fluid from said second fluid reservoir through said porous solid to said central opening; means, including electrically actuable valve means, coupling said first fluid reservoir to said container to permit the flow of fluid from said first fluid reservoir into said central opening; suction pump means supported by said first housing means and adapted to produce a pressure lower than borehole pressure; means, including third electrically actuated valve means, for coupling said pump to said generally annular space to lower the pressure at said central opening of said pad relative to borehole pressure around said pad; means, including pressure reversing and amplifying means and fourth electrically actuated valve means, coupling said pump means to said jacking means for actuating said jacking means by subjecting said jacking means to pressure greater than borehole pressure upon actuation of said fourth valve means; said hydraulic coupling means further including a fluid-tight container hydraulically coupled to said generally annular space and a fluid-filled bellows fluidly coupled to said suction pump means upon actuation of said third valve means; means for measuring the electrical conductivity of liquids entering said generally annular space; and means for electrically measuring physical changes produced by fluids from said second fluid reservoir when said fluids contact earth formations adjacent said portion of said filter cake.

10. Apparatus for injecting formation testing fluids into earth formations behind a filter cake lining the wall of a borehole, comprising: a housing adapted to be passed through the borehole and positioned opposite an earth formation under investigation; isolating means carried by said housing and including a rigid hollow portion opening toward and having edges adapted to engage an earth formation under investigation; means for selectively urging said edges of said hollow portion of said isolating means into sealing engagement with said borehole wall so as to isolate the portion of said borehole wall included within said edges; means connected to said isolating means for selectively lowering the pressure within said hollow portion relative to borehole pressure to produce a differential pressure across said filter cake to effect a flow of formation fluids into said hollow portion of sufficient magnitude to wash away at least a portion of the filter cake through which said earth formation fluids flow; and means connected to said isolating means for controllably injecting testing fluids through said hollow portion into said earth formation.

11. A method for the exploration of materials in earth formations traversed by a borehole on the sides of which mudcake has formed, comprising the steps of: isolating an area of the borehole wall including any mudcake adjacent thereto, selectively producing a pressure on the isolated area of the borehole wall that is less than the pressure of fluids in the earth formations adjacent said area to cause the fluids present in the earth formations adjacent the isolated area to flush the mudcake away from said isolated area of the borehole wall and into an area removed from said isolated area, introducing after removal of said mudcake an agent capable of affecting a characteristic of the materials in the earth formations into a space contiguous with exposed portions of said earth formations in the isolated area of the borehole wall at a pressure at least equal to the pressure of the fluid present in the earth formations, and detecting said characteristic of said materials after exposure to said agent.

12. A method for detecting the presence of oxidizable materials in earth formations traversed by a borehole on the sides of which mudcake has formed, comprising the steps of:

isolating an area of the borehole wall including any mudcake adjacent thereto;

selectively establishing in a space contiguous with said isolated area a pressure substantially less than the pressure of fluids present in the earth formations adjacent the isolated area so as to cause said fluids to flush the mudcake out of and away from said isolated area of the borehole wall and into an area removed from said isolated area;

subsequently introducing after removal of the mudcake an oxidizing agent capable of reacting with oxidizable materials in the earth formations into said space at a pressure at least equal to the pressure of the fluid present in the earth formations so as to cause a detectable reaction between said oxidizing agent and any oxidizable materials present in said formation; and detecting an increase in temperature of a point within the area of influence of said detectable reaction representative of the occurrence of such a reaction.

13. A method for detecting the presence of oxidizable materials in earth formations traversed by a borehole on the sides of which mudcake has formed, comprising the steps of:

isolating an area of the borehole wall including any mudcake adjacent thereto;

selectively creating a pressure within a space contiguous with said isolated area of a magnitude sufficiently less than the pressure of fluids present in the earth formations adjacent the isolated area to cause said fluids to flush out and away the mudcake from said isolated area of the borehole wall and into an area removed from said isolated area;

maintaining the flow of fluids from said formation for a period of time sufficient to remove enough mudcake from said isolated area to expose at least some portions of said adjacent earth formations to contact with substances introduced into said space;

subsequently introducing after removal of the mudcake a predetermined quantity of an oxidizing agent capable of reacting with oxidizable materials in the earth formations into said space contiguous with the exposed portions of said earth formations in the isolated area of the borehole wall at a pressure at least equal to the pressure of the fluids present in the earth formations so as to cause a detectable reaction between said oxidizing agent and any oxidizable materials present in said formation;

detecting an increase in temperature at a point within the influence of said reaction and resulting therefrom; and providing an indication of said temperature increase representative of the presence of oxidizable materials in the particular earth formations under investigation.

References Cited by the Examiner

UNITED STATES PATENTS

| | | | |
|---|---|---|---|
| 2,338,372 | 1/44 | Wright | 166—44 |
| 2,696,262 | 12/54 | Powers | 166—43 X |
| 2,983,586 | 5/61 | Blanchard | 23—230 |

RICHARD C. QUEISSER, *Primary Examiner.*

ROBERT L. EVANS, JOSEPH P. STRIZAK, *Examiners.*